June 4, 1940.　　　　C. WHEATLEY　　　　2,203,399
VALVE
Filed July 31, 1939
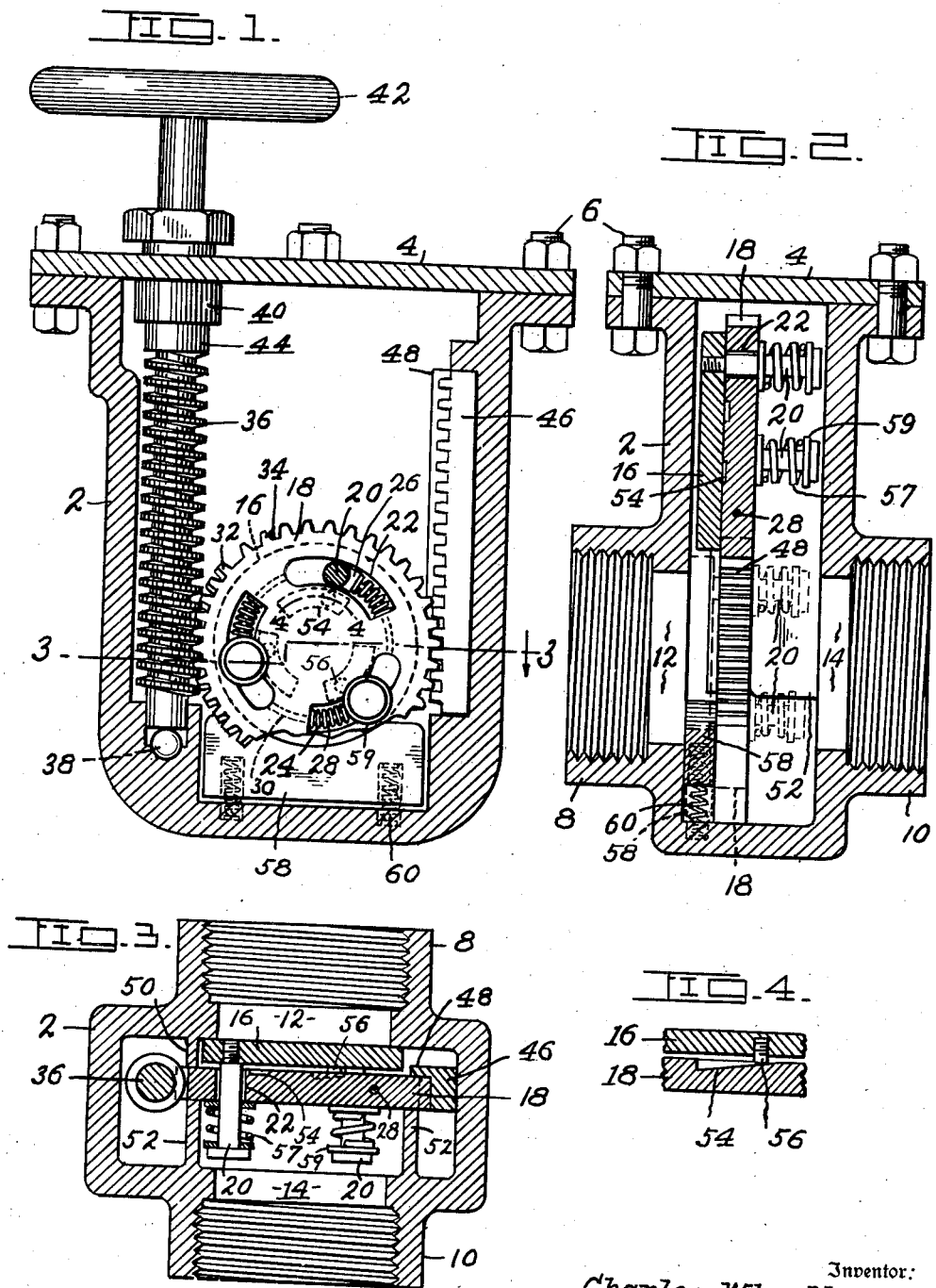
Inventor:
Charles Wheatley,
F. G. Fischer,
Attorney.

Patented June 4, 1940

2,203,399

UNITED STATES PATENT OFFICE 2,203,399

VALVE

Charles Wheatley, Kansas City, Mo.

Application July 31, 1939, Serial No. 287,569

15 Claims. (Cl. 251—54)

My invention relates to gate valves and one object is to provide a valve of this character having a casing with openings therein and a closure for one of the openings which is adapted to travel transversely to the axis of the opening without scraping against the interior of the casing.

A further object is to provide a valve in which the closure is moved laterally when being either seated or unseated.

Other objects will hereinafter appear and in order that the invention may be fully understood, reference will now be had to the accompanying drawing, in which—

Fig. 1 is a vertical sectional view of the valve in closed position.

Fig. 2 is a vertical cross section showing the valve in open position in full lines and in closed position in dotted lines.

Fig. 3 is a horizontal cross section on line 3—3 of Fig. 1.

Fig. 4 is an enlarged fragmentary section on line 4—4 of Fig. 1.

Referring in detail to the different parts, 2 designates a valve casing which is provided with a removable cover plate 4 held in place with bolts 6. The lower portion of the valve casing has a passage therethrough and axially alined integral pipe flanges 8 and 10 which are axially alined with openings 12 and 14, respectively, forming a part of the passage. The opening 12 is surrounded with the usual valve seat adapted to be engaged by a rotatable disk 16.

The disk 16 is yieldably connected to a compound gear wheel 18 by means of pins 20 and segmental slots 22, which former project through the latter and are secured to the disk 16. The pins 20 are urged toward one end of the respective slots 22 with coil springs 24 interposed between the opposite ends of the slots and shoes 26 which bear against the pins and are operably held in place with arcuate stems 28 slidably mounted in respective counterbores 30 formed in the gear wheel 18.

A portion of the periphery of gear wheel 18 has spaced inclined teeth 32 and another portion has spur teeth 34. The inclined teeth 32 are adapted to intermesh with the thread of a vertical screw 36 mounted at its lower end upon a ball thrust bearing 38 and extending upwardly through a stuffing box 40 carried by the cover plate 4. The upper end of the screw 36 is equipped with a hand wheel 42 whereby it may be rotated to the right or left. A collar 44 bearing against the underside of the stuffing box 40 is secured to the screw 36 to cooperate with the bearing 38 in preventing vertical movement of the screw.

The spur teeth 34 are adapted to intermesh with a vertically disposed rack 46 arranged diametrically opposite and paralleling the screw 36 to cooperate therewith in imparting a vertical as well as a rotary movement to the gear wheel 18. The gear wheel 18 is guided in its vertical movements by means of a flange 48, extending longitudinally of the rack 46, and vertical guides 50 and 52 on the inner sides of the casing. The flange 48 and guide 50 engage one side of the gear wheel 18, while the guides 52 engage the opposite sides of said gear wheel and prevent the same from moving laterally with disk 16 when the latter is being seated or unseated.

Lateral movement of disk 16 toward the valve seat is accomplished through the medium of equally spaced inclined surfaces 54, countersunk in one side of gear wheel 18, and studs 56 engaging said surfaces and projecting laterally from disk 16. Lateral movement of the disk 16 in the reverse direction is had through the medium of coil springs 57 interposed between washers 59 loosely mounted upon the pins 20.

The lower portion of the valve casing 2 is equipped with a brake shoe 58 for frictional engagement with the periphery of disk 16, towards which the shoe 58 is urged by means of coil springs 60.

When the valve is in open position as shown by Fig. 2, it may be closed by rotating screw 36 in a direction to rotate the gear wheel 18 counterclockwise and also causes it to travel downward on rack 46 until it is in axial alinement with opening 12. Disk 16 is caused to rotate and move downward with gear wheel 18 through the intermediary of the pins 20 and springs 24 which latter hold the pins 20 in the forward ends of slots 22.

As disk 16 nears the valve seat it comes into contact with the brake shoe 58 which is forced downward until coil springs 60 are compressed to such extent as to cause shoe 58 to exert sufficient friction on disk 16 to check the rotary movement thereof. Gear wheel 18, however, continues to rotate due to yielding of the springs 24 and causes the inclined surfaces 54 to push the studs 56 and the disk 16 laterally until the disk is firmly seated and springs 24 have been compressed to such extent as to prevent further rotation of the gear wheel 18.

When it is desired to open the valve the screw 36 is rotated in the reverse direction causing the gear wheel 18 to rotate clockwise and relieve the pressure on disk 16 which is moved axially from its seat through the medium of the pins 20 and the springs 57. Continued rotation of screw 36 causes the gear wheel 18 to travel upward, or transversely to the axis of opening 12, on rack 46 and carry the disk 16 therewith until the opening 12 is fully uncovered. When the disk 16 is moved axially from its seat, as stated, the springs 24 expand and force the pins 20 against the adjacent end of slots 22.

From the foregoing description it is apparent that I have provided a valve having the advantages above pointed out, and while I have shown one form of said valve I reserve all rights to such other forms and modifications thereof as properly fall within the spirit and scope of the invention as claimed.

Having thus described my invention, what I claim and desire to secure by Letters Patent is:

1. A valve comprising a casing having a passage therethrough, a gear wheel in the casing, a closure arranged beside and movably connected to said gear wheel and adapted to control the passage, coacting means mounted in the casing and intermeshing with said gear wheel to move it and the closure transversely to the axis of the passage, and coacting means associated with the closure and the gear wheel for moving said closure axially relative to the passage and the gear wheel.

2. A valve comprising a casing having a passage therethrough, a gear wheel in the casing, a closure arranged beside and movably connected to said gear wheel and adapted to control the passage, coacting means mounted in the casing and intermeshing with said gear wheel to move it and the closure transversely to the axis of the passage, a recess in the gear wheel having an inclined surface, and means projecting from the closure to coact with said inclined surface in moving said closure axially relative to the gear wheel and the passage.

3. A valve comprising a casing having a passage therethrough, a gear wheel in the casing, a closure arranged beside and movably connected to said gear wheel and adapted to control the passage, coacting means mounted in the casing and intermeshing with said gear wheel to move it and the closure transversely to the axis of the passage, recesses in the gear wheel having inclined surfaces, and studs projecting from the closure to coact with said inclined surfaces in moving said closure axially relative to the gear wheel and the passage.

4. A valve comprising a casing having a passage therethrough, a gear wheel in the casing, a closure arranged beside and movably connected to said gear wheel and adapted to control the passage, coacting means mounted in the casing and intermeshing with said gear wheel to move it and the closure transversely to the axis of the passage, coacting means associated with the closure and the gear wheel for moving said closure axially in one direction to close the passage, and resilient means associated with the closure and the gear wheel for moving said closure axially in the reverse direction to open the passage.

5. A valve comprising a casing having a passage therethrough, a closure in the casing for controlling said passage, a gear wheel arranged beside said closure, pins loosely connecting the closure to said gear wheel, springs coacting with said pins for moving the closure axially in one direction independently of the gear wheel, coacting means associated with the closure and the gear wheel for moving said closure axially in the reverse direction independently of the gear wheel, and means intermeshing with the gear wheel for moving it and the closure transversely to the axis of the passage.

6. A valve comprising a casing having a passage therethrough, a gear wheel in the casing, a closure arranged beside and movably connected to said gear wheel and adapted to control the passage, a screw journaled in the casing and intermeshing with said gear wheel to rotate and move the same and the closure transversely to the axis of the passage, a rack fixed in the casing to coact with said screw in imparting the transverse movement to the gear wheel and the closure, and coacting mean associated with the closure and the gear wheel for moving said closure axially relative to the passage and the gear wheel.

7. A valve comprising a casing having a passage therethrough surrounded by a seat, a closure in the casing for controlling the passage, a gear wheel for rotating and moving the closure toward or away from the axis of the seat, yielding means connecting the closure to the gear wheel to permit limited independent movement of the said gear wheel and the closure, means for operating the gear wheel, means for checking the rotary movement of the closure as it approaches the axis of the seat, and means associated with the closure and the gear wheel for moving the closure axially against the seat when in, or approximately in, axial alinement with said seat.

8. A valve comprising a casing having a passage therethrough surrounded by a seat, a closure in the casing for controlling said passage, operating means yieldably connected to said closure for rotating and moving the same toward or away from the axis of the seat, a friction brake in the casing for checking rotation of the closure as the axis thereof nears the axis of the seat, and means associated with the closure and its operating means for moving the closure axially against the seat after said closure has engaged the friction brake.

9. A valve comprising a casing having a passage therethrough surrounded by a seat, a closure in the casing for controlling said passage, operating means yieldably connected to said closure for rotating and moving the same toward or away from the axis of the seat, a friction brake in the casing for checking rotation of the closure as the axis thereof nears the axis of the seat, means associated with the closure and its operating means for moving the closure axially against the seat after said closure has engaged said friction brake, and resilient means associated with the closure and its operating means for unseating the closure as the same is moved out of engagement with the friction brake.

10. In a valve, a casing having a passage therethrough, a rotatable disk in the casing for controlling said passage, a friction brake in the casing for checking rotation of said disk as the same moves into position to close the passage, a gear wheel mounted beside the disk for rotating the same and moving it into or out of engagement with the brake, and yieldable means connecting the disk and said gear wheel adapted to permit limited independent rotary movement of the gear wheel when rotary motion of the disk is checked.

11. In a valve, a casing having a passage therethrough, a rotatable disk in the casing for controlling said passage, a friction brake in the casing for checking rotation of said disk as the same moves into position to close the passage, a gear wheel having segmental slots and adapted to rotate and move the disk into or out of engagement with the brake, pins fixed to the disk and projecting laterally through the slots, and springs interposed between said pins and one end of the respective slots to coact with the pins for transmitting rotary motion from the gear wheel to the disk and permitting limited independent rotary movement of the gear wheel when rotary motion of the disk is checked.

12. In a valve, a casing having a passage therethrough surrounded by a seat, a disk in the casing for controlling said passage, operating means for rotating and moving said disk toward or away from the axis of the seat, and coacting means associated with the disk and said operating means for moving the disk laterally to the seat when the disk is moved into axial alinement therewith.

13. In a valve, a casing having a passage therethrough surrounded by a seat, a disk in the casing for controlling said passage, operating means for rotating and moving said disk toward or away from the axis of the seat, coacting means associated with the disk and said operating means for moving the disk laterally to the seat when the disk is moved into axial alinement therewith, and coacting means associated with the disk and its operating means for moving the disk laterally from the seat as the disk is moved out of axial alinement therewith.

14. In a valve, a casing having a passage therethrough surrounded by a seat, a disk in the casing for controlling said passage, operating means for rotating and moving said disk toward or away from the axis of the seat, means for checking the rotary motion of the disk as it nears the axis of the seat, and coacting means associated with the disk and said operating means for moving the disk laterally to the seat when the rotary motion of the disk is checked.

15. In a valve, a casing having a passage therethrough surrounded by a seat, a disk in the casing for controlling said passage, operating means for rotating and moving said disk toward or away from the axis of the seat, means for checking the rotary motion of the disk as it nears the axis of the seat, coacting means associated with the disk and said operating means for moving the disk laterally to the seat when the rotary motion of the disk is checked, and coacting means associated with the disk and its operating means for moving the disk laterally from the seat as the disk is moved out of axial alinement therewith.

CHARLES WHEATLEY.